W. C. BROYHILL & W. D. SPERRY.
Improvement in Churn-Dashers.
No. 120,849.     *Fig. 1.*     Patented Nov. 14, 1871.
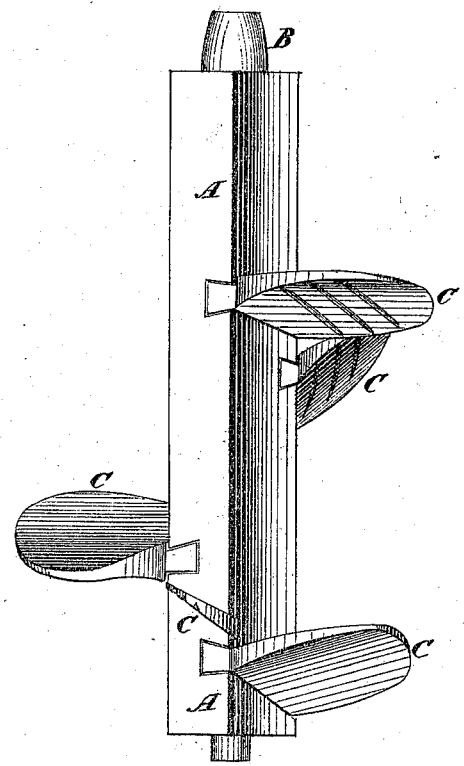
*Fig. 2.*
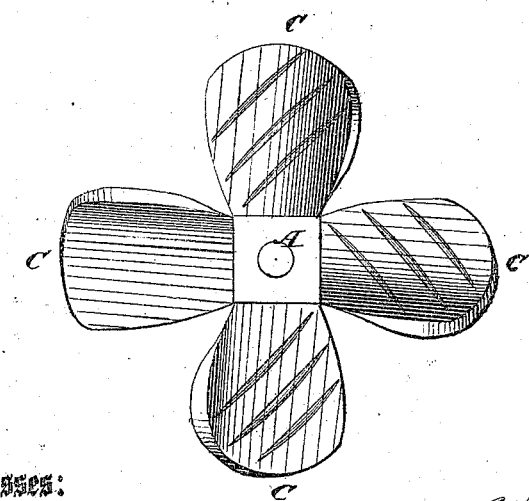

// 120,849

UNITED STATES PATENT OFFICE.

WILLIAM C. BROYHILL AND WILLIAM D. SPERRY, OF TREMONT, ILLINOIS.

IMPROVEMENT IN CHURN-DASHERS.

Specification forming part of Letters Patent No. 120,849, dated November 14, 1871.

*To all whom it may concern:*

Be it known that we, WILLIAM C. BROYHILL and WILLIAM D. SPERRY, of Tremont, in the county of Tazewell and State of Illinois, have invented a new and useful Improvement in Churn-Dashers; and we do hereby declare that the following is a full, clear, and exact description thereof, which will enable others skilled in the art to make and use the same, reference being had to the accompanying drawing forming part of this specification.

Our invention has for its object to provide for use of farmers and dairymen an improved churn-dasher, which shall be capable of completing the operation of churning more quickly and also better adapted for use in gathering the butter than others of its class. To this end we groove the under side of the radial dasher-blades, make them of wedge-form in cross-section, and set them at an inclination of about thirty degrees to the vertical shaft.

In the accompanying drawing, Figure 1 is an elevation of the churn-dash. Fig. 2 is an end view, showing the lower blades.

Similar letters of reference indicate corresponding parts.

A is the shaft, which is revolved by means of a crank and gear-wheels at the top of the churn or in any convenient manner. The shaft is supported in an upright position by a step in the churn-bottom and by the top of the churn, in which the upper journal B revolves. This journal extends up through the top and receives a gear-wheel or crank for revolving the dash. C represents the blades, four (more or less) in number. The form of these blades is seen in Fig. 2. They are oblong pieces of wood dovetailed into the shaft or otherwise attached thereto, either permanently or removably, at an inclination of thirty degrees, more or less, with the shaft, so that when revolved they will operate like the blades of a propeller and force the cream either upward or downward, according to the direction the shaft is turned. The under side of these blades is grooved, so as to increase the friction of the blade on the cream. The agitation produced by the revolving of the shaft, thus bladed, in the cream soon breaks the globules of butter and completes the process of churning.

In churning the dasher is turned so as to raise the cream. In gathering the butter after the process of churning is completed the dash is turned in the opposite direction.

This dasher is readily removed from the churn for cleaning, is very simple and effective, cheaply made, and requires but a slight exertion of power to operate it.

The blades may be made so that a portion of them may be removed for small churnings, if desired.

Having thus described our invention, we claim as new and desire to secure by Letters Patent—

1. The dasher-blades, provided with grooves on the under side, substantially as and for the purpose specified.

2. The improved churn-dasher, formed of the radial oval blades C, made of wedge-form in cross-section, and set at an inclination of about thirty degrees to their shaft A, as shown and described.

WILLIAM C. BROYHILL.
WILLIAM D. SPERRY.

Witnesses:
M. BAILEY,
A. SPERRY. (45)